June 30, 1942.　　　　R. W. BROWN　　　　2,287,969
BRAKE SYSTEM
Filed Sept. 23, 1940　　　3 Sheets-Sheet 1

INVENTOR
Ray W. Brown
BY Evans & McCoy
ATTORNEYS

June 30, 1942.    R. W. BROWN    2,287,969
BRAKE SYSTEM
Filed Sept. 23, 1940    3 Sheets-Sheet 3
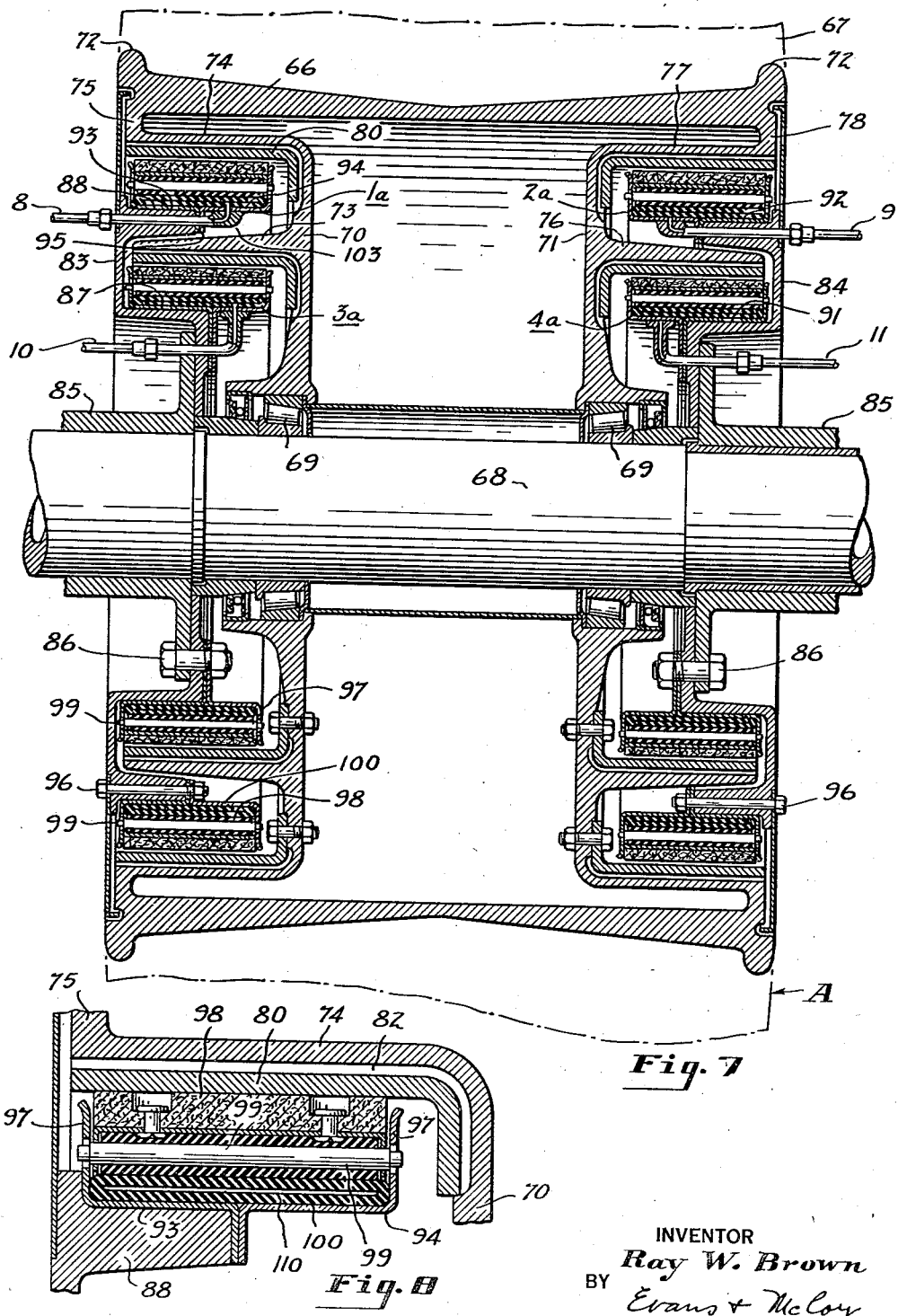
INVENTOR
Ray W. Brown
BY Evans + McCoy
ATTORNEYS Patented June 30, 1942

2,287,969

UNITED STATES PATENT OFFICE 2,287,969

BRAKE SYSTEM

Ray W. Brown, Akron, Ohio, assignor to The General Tire & Rubber Company, Akron, Ohio, a corporation of Ohio Application September 23, 1940, Serial No. 357,834

8 Claims. (Cl. 188—152)

This invention relates to brake systems, and more particularly to an improved brake arrangement or system and a control therefor suitable for use on the wheels of aircraft.

It is an object of the invention to provide a brake system incorporating a number of independent brakes operatively associated with one wheel, together with means for selectively actuating one or more of the brakes simultaneously.

Another object is to provide a brake system for a vehicle having a number of wheels, each equipped with a plurality of brakes, in which a selective control is provided so that all or less than all of the brakes on each wheel can be operated from a single brake energizing means.

Another object is to provide a brake system for a multiple wheeled vehicle in which multiple brakes on each wheel are connected together so as to be operable from a common brake energizing means, and in which a control is interposed to selectively disconnect from the energizing means a group of brakes, including at least one brake from each wheel.

Another object is to provide an improved wheel and brake structure for vehicles. More specifically, the invention aims to provide a wheel and brake structure wherein multiple brakes are concentrically disposed one within another.

A number of structural features are embodied in the invention and include an improved means for mounting fluid operated friction members in a multiple brake wheel structure; an improved arrangement of parts in a wheel structure whereby a plurality of brakes are operatively associated in axially spaced relation with respect to one another and within the opposite walls of a wheel; and an improved fluid control for a hydraulic brake system in which a valve is provided to connect the different brakes to the fluid energizing means. Other objects and advantages will be apparent from the following detailed description of a suitable embodiment of the invention made in connection with the accompanying drawings, in which:

Fig. 7 is a sectional view, with parts broken away, taken substantially on line 7—7 of Fig. 5 and enlarged with respect thereto, to show the internal structure of the wheel and brake mechanism; and Fig. 8 is a fragmentary sectional detail on an enlarged scale showing one of the brakes in frictional engagement with one of the brake drums.

In the embodiment of the invention illustrated, my improvements have been incorporated in a hydraulic brake system and this system is designed for use on a dual wheeled airplane. It is, of course, within the contemplation of the present invention to equip other vehicles having a greater or fewer number of wheels and employing brake actuating means other than the hydraulic apparatus illustrated.

Figure 1:
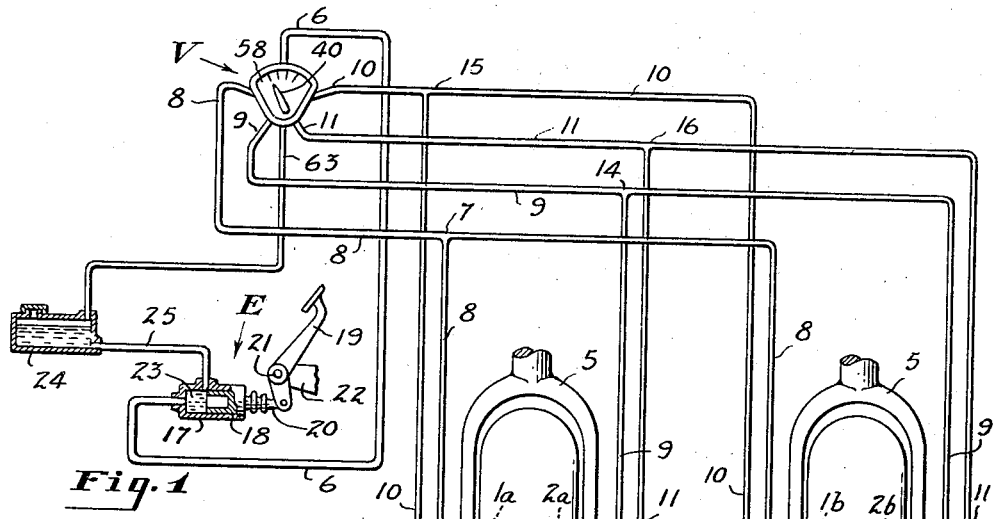
Figure 1 is a diagrammatic illustration of the brake system illustrating the fluid lines or conduits and their connections with one another and with the control and energizing means.

Referring to the drawings by numerals of reference which indicate like parts throughout the several views, the system, as illustrated in Fig. 1, comprises a pair of vehicle supporting wheels A and B rotatably mounted in forks 5 carried by a suitable carriage structure or structures of an airplane (not shown). If desirable, this landing wheel carriage or structure may be retractable. The wheel A is provided with outer brakes *1a* and *2a* and inner brakes *3a* and *4a*. A similar set of brakes, indicated by the suffix "*b*", is provided for the wheel B.

An energizing means E is provided to supply high pressure fluid to the brakes. The energizing means is connected by a conduit 6 to a control valve V which, as will later appear, is arranged to distribute the high pressure fluid from E to some or all of the brakes.

The brakes of the several wheels are connected together in pairs so as to be actuated simultaneously, although it is also contemplated to provide separate control valves for each wheel. A conduit 8 is connected to the valve V, being divided at 7 and having the branches thereof connected to the brakes *1a* and *1b*. Similarly, condiits 9, 10, and 11, branching or dividing at 14, 15 and 16, respectively, connect the brakes 2a, 2b, 3a, 3b, and 4a and 4b, respectively, in pairs to the control valve V. In this manner, and as will be later described in detail, high pressure fluid supplied to the control valve V from the energizing means E is distributed to the several brakes to actuate the latter. The energizing means E may be of conventional design, although it is preferable to provide for a greater travel of the pedal or other operative element than is customary in conventional brake systems. In the form illustrated, the energizing means comprises a housing 17 having a cylinder which receives a reciprocable piston 18 therein actuable by a pedal 19, to which the piston is connected by a link or rod 20. The pedal 19 is pivoted at 21 on a suitable support 22 and, of course, may be replaced by a hand operated lever if desired. A body of brake fluid or liquid in the cylinder of the housing 17 and indicated at 23 is placed under pressure by actuation of the pedal 19 so as to force the fluid into the conduit 6 leading to the control valve V.

In order to maintain a sufficient volume of fluid in the housing 17, a reservoir or supply container 24 is provided and is connected by a conduit 25 to the housing 17, opening into the fluid chamber in the latter through a port which is uncovered by the piston 18 when the latter is fully retracted. Accordingly, each time the piston 18 is retracted past the port or opening of the tube 25 into the cylinder chamber in the housing 17, a deficiency in the quantity of oil in the system is replenished from the reservoir 24 through the conduit 25. Suitable springs (not shown) may be used to retract the actuating pedal 19 to substantially the position shown, or the retraction may be effected by the pressure of the fluid acting through the piston 18 under the influence of the pressure exerted by the contraction of the elastic expansible members used in the brakes, and to be later described.

Figure 2:
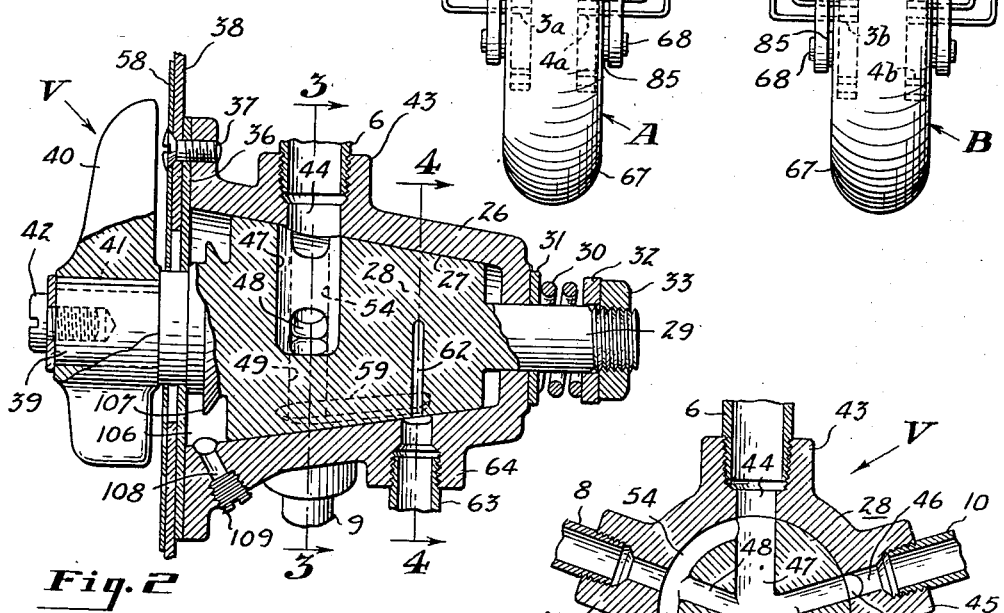
Fig. 2 is a sectional view, with parts broken away and with parts removed, showing the construction of the improved control or distributing valve used to supply high pressure fluid to the conduits connected to the several brakes.
Figure 4:
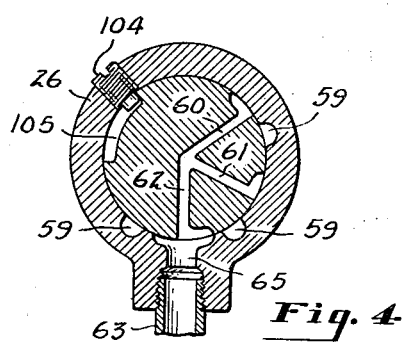
Fig. 4 is a transverse sectional detail taken substantially on the line 4—4 of Fig. 2.

The valve V, shown in detail in Fig. 2, comprises a housing 26 of brass, iron or other suitable metal, having a tapered bore or frusto conical recess 27 formed therein to receive a matching conical tapered plug or valve body 28. The small diameter end of the body or plug 28 is formed with or has secured thereto a stud 29 which extends through an end opening in the housing 26. A helical compression spring 30 is received on the stud 29 externally of the small end of the housing and between washers 31 and 32, and is compressed by a nut 33 so as to draw the body 28 snugly into the bore or recess 27. A plate 36, disposed across the large diameter or open end of the housing 26, is secured thereto by screws 37 which, if desired, may extend through dashboard or instrument panel 38 of the airship. A reduced diameter extension 39 of the body 28 passes through a suitable opening in the cover plate 36 and receives an actuating handle 40, the latter being secured in place by a key 41 and a bolt 42.

The supply tube or conduit 6 is connected to a boss 43 formed on the housing 26 and fluid from the conduit enters the housing chamber 27 through a passage 44 opening into the chamber 27 through a port in the wall of the latter.

A passage 47 formed in the rotatable valve body 28 is arranged to register with the port of the passage 44 to receive high pressure fluid therefrom and to distribute the high pressure fluid to branch passages 48, 49, 50 and 51, which register with the openings to the passages 46 so as to conduct the distributed fluid to the conduits 8, 9, 10 and 11, respectively.

Figure 3:
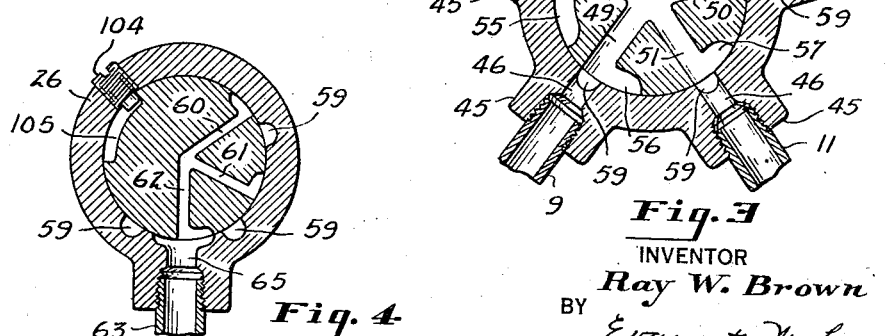
Fig. 3 is a transverse sectional detail taken substantially on line 3—3 of Fig. 2.
Figure 5:
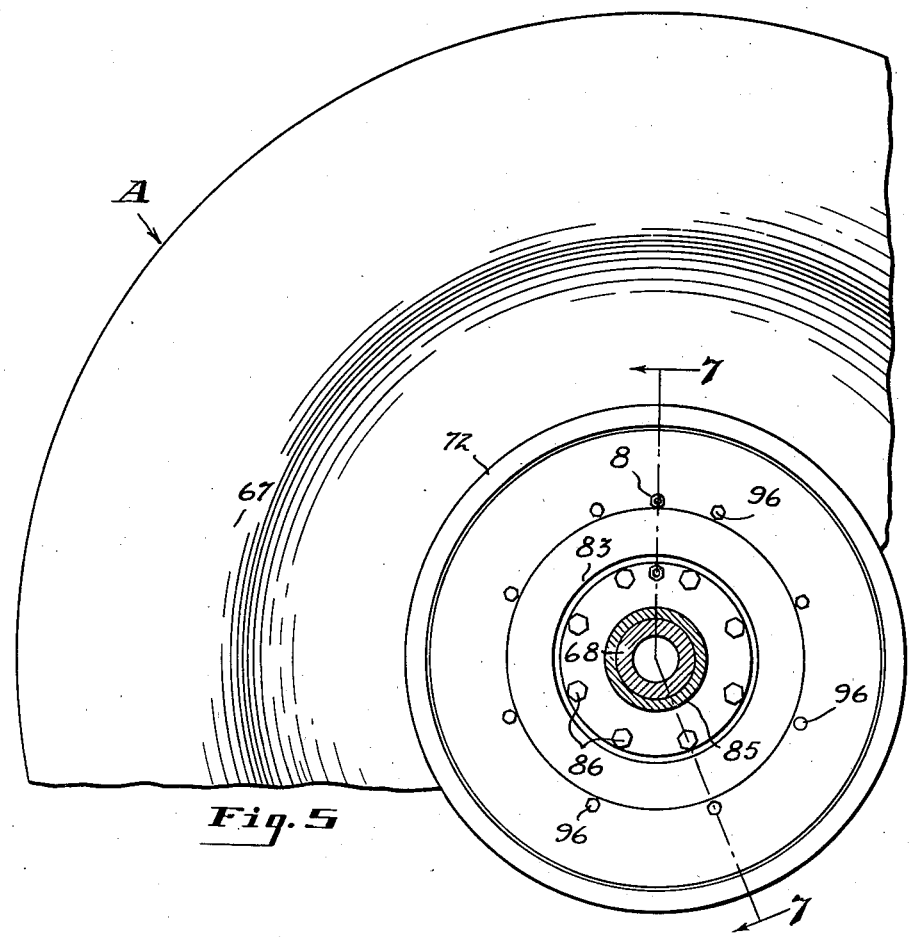
Fig. 5 is an elevational view, with parts removed, showing an airplane wheel of the character employed in the structure of the present invention.
Figure 6:
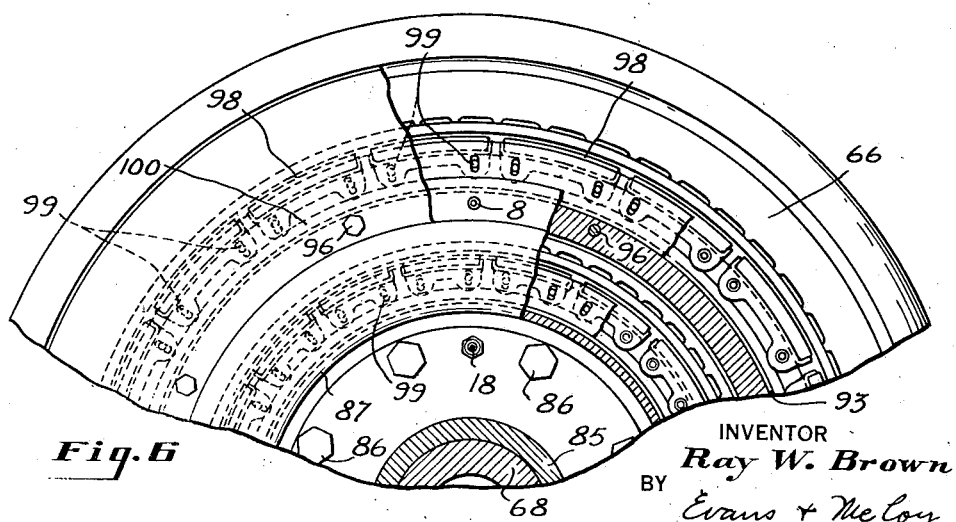
Fig. 6 is a sectional detail on an enlarged scale, with parts broken away, of the wheel shown in Fig. 5, and with the pneumatic tire removed therefrom.

Upon slight rotation of the valve body 28 in a clockwise direction, as viewed in Fig. 3, and by means of the operating handle 40, the opening of the distributing passage 50 is moved beyond or out of register with the opening to the conduit 10, so that high pressure fluid entering the valve V through the conduit 6 is distributed only to the brakes 1a and 1b, 2a and 2b, and 4a and 4b, the fluid connections between the passages 47, 48, 49 and 51 in the valve body 28 being maintained in communication with the ports of the passages leading from the conduits 6, 8, 9 and 11 by means of circumferential extending passages 54, 55, 56 and 57 formed or recessed in the surface of the valve body 28. Brakes 3a and 3b are thus disconnected or shut off from the source of fluid under pressure.

The circumferential recesses 54, 55, 56 and 57 are respectively of progressively decreasing circumferential length so that as the valve body 28 is rotated in a clockwise direction, the fluid connection between the brake conduits 11 and 9 and the supply conduit 6 are successively interrupted one after the other, while the fluid connection between the brake conduit 8 and the supply conduit 6 is maintained through the circumferential passages 54 and 55. Thus, the valve body 48 may be rotated or shifted between a plurality of different positions in which different fluid connections are established. In position number one, illustrated in the drawings, the high pressure fluid introduced to the valve V through the supply conduit 6 from the energizing means E is distributed under equal pressure to the four brake conduits 8, 9, 10 and 11. In the second position (not shown) the fluid connection between the supply conduit and the brake conduit 10 is interrupted and the high pressure fluid is distributed under equal pressure to the brake conduits 8, 9 and 11. The third position (not shown) of the valve body interrupts the fluid connection to the conduits 10 and 11 while maintaining the fluid connection for the distribution of high pressure fluid to the conduits 8 and 9; while in the fourth position (not shown) of the valve body the fluid connection between the supply conduit 6 and all of the brake conduits except 8 is interrupted and the entire braking action is produced by the brakes 1a and 1b supplied with high pressure fluid by the conduit 8.

If desired, a dial 58 may be mounted on the instrument panel by means of the screws 37 and marked to indicate the four positions of the operating handle 48 which correspond to the four described positions of the valve body 28.

In order to limit the rotative movement of the valve body 28, a stop pin 104 is threaded through the housing 26 and the inner end of the pin is received in a circumferential slot 105 formed or recessed into the surface of the valve body 28. The large diameter end of the valve body is spaced from the cover plate 36 as indicated at 106, and the extension portion 39 of the valve body is formed or provided with an annular thin edged collar or flange 107 which is disposed in the space 106 and discharges oil or brake fluid that may leak from between the valve body and the walls of the housing. Oil accumulating in the space 106 may be released through a passage 108 having a plug 109 threaded therein.

In order to release fluid that may become trapped in any of the conduits 9, 10 and 11 when the latter are disconnected from the fluid supply conduit 6, longitudinally extending recesses or passages 59 are formed in the inside wall of the casing 26 and communicate with the passages 46 which connect respectively with the conduits 9, 10 and 11. Interfitting passages 60, 61 and 62 formed in the valve body 28 are disposed to register with the passages 59 when the valve body is respectively in the second, third and fourth positions described above. A return conduit 63 connected to a boss 64 on the housing 26 communicates through a passage 65 in the housing with one of the passages in the valve body 28, such as the passage 62. By this arrangement high pressure fluid remaining in the brakes and conduits when the valve body 28 is moved beyond the position shown in Fig. 3 is released through the passages 59 in conduits 60, 61 and 62 to flow into the passages 65 and thence into the conduits 63 for return to the reservoir 24. Hence, if the operator should turn the actuating handle 40 rapidly from the first position to either the second, third or fourth positions after the brakes have been applied, the fluid in the conduits leading to the disconnected brakes would be released to flow back to the reservoir, thus allowing the brakes that have been disconnected from the supply conduits to release themselves.

Each of the wheels A and B may be of the construction shown in Figs. 5 through 8, wherein a metal rim 66, which may be cast or otherwise formed, is shaped to receive and support a tire 67 of spaced end walls 70 and 71 which are preferably on bearings 69. The rim 66 of the wheel is carried on the bearings 69 by means of a pair of spaced end walls 70 and 71 which are preferably closer together than parallel edges 72 of the rim which hold the beads (not shown) of the tire 67. The wall 70 is formed with a pair of concentrically arranged outwardly directed circular flanges 73 and 74, the latter being connected at or along its outer edge to one of the outer edges of the rim 66, as indicated at 75. Flanges 76 and 77, corresponding to the flanges 73 and 74, are formed on the wall 71, the flange 77 being connected at or along its outer edge to the opposite edge of the rim 66, as indicated at 78.

If desired, the walls 70 and 71 and the flanges thereon may be cast integral with the rim 66, and in the case of airplane wheels it is preferable that these parts be made of a light alloy such as one of the alloys of aluminum. Secured to the radially inwardly directed faces of the outwardly extending flanges on the walls 70 and 71 are friction drums or members 80, which may be formed of suitable wear resistant material such as hard steel. Desirably, axially extending grooves or channels 82, open at both ends, are formed parallel to one another in the flanges and walls 70 and 71 to provide for circulation of air in back of the friction drums 80.

Disposed on the outside of the wheel walls 70 and 71, and preferably embracing the shaft 68, are stationary or fixed torque members 83 and 84, which, if desired, may be mounted on the shaft 68 as by means of flanged sleeves 85, to which the torque members may be secured as by bolts 86. The torque member 83 is formed with concentric support elements or portions 87 and 88 which are disposed within and underlying the several friction drums held by the flanges 73 and 74, respectively. Similar support elements or portions 91 and 92 are formed or provided on the fixed torque member 84 to underlie the cylindrical drums carried by the flanges 76 and 77.

To the support portion 88 is secured the brake 1a, while the brakes 2a, 3a and 4a are carried respectively by the support portions 92, 87 and 91 of the torque members 83 and 84. The specific construction of the actuable parts of the brakes forms the subject matter of the copending application of Herman T. Kraft, Serial No. 349,543, filed August 2, 1940, now Patent No. 2,252,128, dated Aug. 12, 1941, although any suitable type of brake structure may be used. As adapted to the present invention the movable parts of each of the brake comprises a pair of circular pans or holders 93 and 94 having radial flanges 95 disposed against one another and secured to the support portions of the torque members as by means of bolts 96 and the bolts 86 previously mentioned. The spaced outer edges of the pans 93 and 94 are formed with radial outwardly directed parallel flanges 97 which receive therebetween a plurality of segmental friction elements 98 which have pins 99 interfitting with radial slots formed in the flanges 97 of the pans. Between the friction elements 98 and the bottoms of the pans or holders of each brake and retained between the outward flanges of the holders is an annular tubular expansible member 100 which is preferably made of rubber or similar material and is provided with a suitable tubular connection 103, which may be attached to the brake fluid conduits 8, 9, 10 and 11, previously described.

Fig. 8 illustrates on an enlarged scale the mode of operation of brake 1a, which is representative of the operations of all of the brakes. In this figure the tubular member 100 has been distended or expanded by the force of fluid therein, increasing the size or diameter of the member and forming a chamber 110 therein. This expansion of the tubular annulus 100 forces the friction elements 98 into engagement with the friction drum 80, so that the rotation of the latter is retarded, the torque being resisted through the pins 99 which are interlocked with the pans 93 and 94 carried by the torque member.

In the operation of an airplane, for example, equipped with a brake system of the character described above, the pilot has the option of utilizing on each wheel one, two, three or four brakes. When landing a large and heavy ship, such for example as a transport airplane or a military bombing plane, a field of considerable size is required unless means is provided for bringing the heavy ship to a relatively quick stop after it is grounded. Because of the weight of such ships, conventional brake systems are inadequate to arrest the speed in a sufficiently short time to permit the planes to land on small fields with safety. By the arrangement of the present invention, however, a multiplicity of brakes, all operated in unison, are provided for each wheel so that even the largest ships when so equipped can be quickly brought to rest after landing. However, when taxiing the plane on the ground and otherwise controlling its ground movements, the severe braking action afforded by a multiplicity of brakes may be undesirable. Or in landing even large ships where a large field is available, it may be desirable from the point of view of passenger comfort to use a less severe braking action. Therefore, the unique controlling system embodied in the valve V is available so that the pilot can selectively connect any number of the brakes that he wishes to be operated by the single energizing pedal.

The principles of the present invention may be utilized in various ways, numerous modifications and alterations being contemplated, substitution of parts and changes in construction being resorted to as desired, it being understood that the embodiment shown in the drawings and described is given merely for purposes of explanation and illustration without intending to limit the scope of the claims to the specific details disclosed.

What I claim is:

1. In a hydraulic brake system having a plurality of fluid actuable brakes operatively associated with one wheel, means for energizing the fluid in the system, conduits effecting a fluid connection between the brakes and said means, and valve means interposed in said connection and manually operable to readily interrupt the fluid connection at will between the energizing means and one of the brakes and to radially reestablish such connection at will.

2. In a hydraulic brake system for a vehicle having a plurality of wheels and a number of fluid actuable brakes on each wheel, means for energizing the fluid in the system, conduits connecting the brakes in groups from the several wheels to the energizing means, and valve means interposed in said connections and manually operable to readily interrupt the fluid connection at will between the energizing means and at least one group of the brakes and to radially reestablish such connection at will.

3. In a hydraulic brake system having a plurality of fluid actuable brakes operatively associated with one wheel, means for energizing the fluid in the system, a valve including a housing having a movable body therein, a conduit connecting the valve to the energizing means, and a plurality of conduits connecting the valve to the several brakes, said valve body and housing being cooperatively formed so that in different positions of the body fluid supplied to the valve through the first named conduit is distributed to different numbers of the conduits connected to the several brakes.

4. In a brake system for a vehicle wheel, a plurality of brakes operatively associated with the wheel, means common to all of the brakes for energizing the same, and means connecting the brakes and the energizing means, said connecting means including control means so constructed and arranged that in one position the energizing means is operatively connected to all of said brakes and in another position the energizing means is operatively connected by said control means to less than all of the brakes and the brakes not operatively connected remain idle during normal operation of the operatively connected brakes actuated by the energizing means.

5. In a brake system for a pair of vehicle wheels, a plurality of brakes operatively associated with each wheel, means common to all of the brakes for energizing the same, and means connecting the energizing means and the brakes so that corresponding brakes of the different wheels are interconnected in pairs for concurrent operation, said connecting means including control means so constructed and arranged that in one position the energizing means is operatively connected to all of said pairs of brakes and in another position the energizing means is operatively connected by said control means to less than all of the pairs of brakes and the brake pairs not operatively connected remain idle during normal operation of the operatively connected brake pairs actuated by the energizing means.

6. In a brake system for a vehicle wheel, a plurality of fluid actuable brakes operatively associated with the wheel, means common to all of the brakes for supplying fluid under pressure, and means connecting the brakes and the fluid supply means, said connecting means including movable control means so constructed and arranged that in one position the supply means is operatively connected to all of said brakes and in another position the supply means is operatively connected to less than all of the brakes and the brakes not operatively connected remain idle during normal operation of the operatively connected brakes energized by the supply means.

7. In a brake system for a pair of wheels, a plurality of actuable brakes operatively associated with each wheel, means common to all of the brakes for supplying fluid thereto under pressure, and means connecting the fluid supply means and the brakes so that corresponding brakes of the different wheels are interconnected in pairs for concurrent operation, said connecting means including movable control means so constructed and arranged that in one position thereof the supply means is operatively connected to all of said pairs of brakes and in another position the supply means is operatively connected to less than all of the pairs of brakes and the brake pairs not operatively connected remain idle during normal operation of the operatively connected pairs of brakes energized by the supply means.

8. In a hydraulic brake system having a plurality of fluid actuable brakes operatively associated with one wheel, a fluid reservoir, means having connection with the reservoir for energizing the fluid in the system, conduit means effecting a fluid connection between said means and the brakes, valve means interposed in said connection and operable to interrupt the fluid connection between the energizing means and one of the brakes, and fluid return means for connecting said one brake to the reservoir during said interruption of the fluid connection.

RAY W. BROWN.

CERTIFICATE OF CORRECTION.

Patent No. 2,287,969.  June 30, 1942.

RAY W. BROWN.

It is hereby certified that error appears in the printed specification of the above numbered patent requiring correction as follows: Page 3, first column, line 33, for "of spaced end walls 70 and 71 which are pref-" read -- and is mounted for rotation on a shaft 68, pref- --; line 36, for "walls 10" read --walls 70--; page 4, first column, lines 18 and 29, claims 1 and 2 respectively, for "radially" read --readily--; and second column, line 31, claim 7, before "actuable" insert --fluid--; line 50, claim 8, after "connection" strike out the comma; and that the said Letters Patent should be read with this correction therein that the same may conform to the record of the case in the Patent Office.

Signed and sealed this 8th day of September, A. D. 1942.

Henry Van Arsdale, (Seal)   Acting Commissioner of Patents.